March 25, 1975 R. L. VAN WINKLE Re. 28,371

PIPE HANDLING APPARATUS

Original Filed Sept. 15, 1967 8 Sheets-Sheet 1

PIPE HANDLING APPARATUS

Original Filed Sept. 15, 1967 3 Sheets-Sheet 2

PIPE HANDLING APPARATUS

Original Filed Sept. 15, 1967 8 Sheets-Sheet

PIPE HANDLING APPARATUS

Original Filed Sept. 15, 1967 8 Sheets-Sheet 5

PIPE HANDLING APPARATUS

Original Filed Sept. 15, 1967 8 Sheets-Sheet 5

PIPE HANDLING APPARATUS

Original Filed Sept. 15, 1967 8 Sheets-Sheet 6

PIPE HANDLING APPARATUS

Original Filed Sept. 15, 1967 8 Sheets-Sheet

PIPE HANDLING APPARATUS

Original Filed Sept. 15, 1967 3 Sheets-Sheet 3

United States Patent

Re. 28,371
Reissued Mar. 25, 1975

28,371
PIPE HANDLING APPARATUS

Roy L. Van Winkle, Dallas, Tex., assignor to Dresser Industries, Inc., Dallas, Tex.

Original No. 3,446,284, dated May 27, 1969, Ser. No. 667,957, Sept. 15, 1967. Application for reissue Nov. 12, 1970, Ser. No. 88,623, which is a division of abandoned reissue application Ser. No. 888,182, Dec. 12, 1969

Int. Cl. E21b *19/16*

U.S. Cl. 173—164 4 Claims

Matter enclosed in heavy brackets [ ] appears in the original patent but forms no part of this reissue specification; matter printed in italics indicates the additions made by reissue.

ABSTRACT OF THE DISCLOSURE

Apparatus for unscrewing selected threaded connections between sections of pipe and the like. Each pipe section having flats on the exterior thereof that are engaged by a wrench whereby torque can be applied to the pipe. Rotation is applied to one of the pipe sections through the wrench and flats while a subjacent pipe section is being held against rotation by a slip device that engages the flats on the subjacent pipe sections, whereby the threaded connection therebetween is broken.

*This is a division of application Ser. No. 888,182, filed Dec. 12, 1969, which is a reissue application on U.S. Pat. No. 3,446,284 granted May 27, 1969 on application Ser. No. 667,957 filed Sept. 15, 1967.*

Background of the invention

This invention relates generally to pipe handling apparatus. More particularly, but not by way of limitation, this invention relates to apparatus for unscrewing selected threaded connections between sections of pipe and the like wherein the apparatus is incorporated in rotary drilling machines of the top drive type.

In the top drive rotary drilling machine, the uppermost section of the drill pipe is generally connected to a rotary drive mechanism that imparts rotation to the drill string. The rotary drive mechanism is usually carried on a cross head which is raised and lowered in a mast to either raise or lower the pipe sections in a well bore or the like.

In using the top drive machines in drilling well bores and particularly in drilling raises between drifts in mines, the pipe sections forming the pipe string connecting the drill bit with the rotary drive mechanism are subjected to extremely high torque loads. The result of the loads imposed on the pipe sections, which are interconnected by threads is that the threaded connections become extremely tight and require a very high torque to break the connection. Therefore, it is necessary to provide some means for imposing the required torque on the threaded connections and it is highly desirable, if not essential, that such torque be applied only to the connection that is to be separated. In addition to the foregoing, any device utilized to break the connections must also permit transmission of torque to the pipe from the rotary drive during drilling operations; it must be sufficiently strong to permit the imposition of the required torque for breakout; and, at the same time, it must be of a size and weight that can be readily handled by personnel operating the drilling machine. Due to the conditions under which the drilling machines operate, it is also highly desirable that the device utilized for breaking the threaded joints be extremely rugged and, yet, as simple in construction and operation as possible to reduce both cost and maintenance.

Summary of the invention

This invention provides improved apparatus for unscrewing selected threaded connections between sections of pipe or the like wherein each pipe section has flats on the exterior thereof. The apparatus includes means for rotating the pipe and means for displacing the rotating means along the axis of the pipe. A chuck member is slidingly mounted on the rotating means and is engageable with a wrench that is positioned in the flats. When the chuck is moved into engagement with the wrench, the rotating means is positively connected with the pipe section whereby the pipe section and rotating means are connected for common rotation. The apparatus also includes slip means that are movable into holding engagement with the flats on the pipe section to permit loosening of the connection between the rotating means and the pipe section. The slip means are then engaged with the flats on a subjacent pipe section whereby rotation of the rotating means with the wrench and first pipe section unthreads the threaded connection between the pipe sections.

It is one object of the invention to provide improved pipe handling apparatus for unscrewing selected threaded connections between sections of pipe and the like.

Another object of the invention is to provide improved pipe handling apparatus that is relatively uncomplicated in structure and yet provides the extremely high torque required to unscrew the threaded connections.

Still another object of the invention is to provide improved pipe handling apparatus for unscrewing selected threaded connections between sections of pipe that is positive in operation and is relatively maintenance free.

The foregoing and additional objects and advantages of the invention will become more apparent as the following detailed description is read in conjunction with the accompanying drawings.

Description of one embodiment

Figure 2:
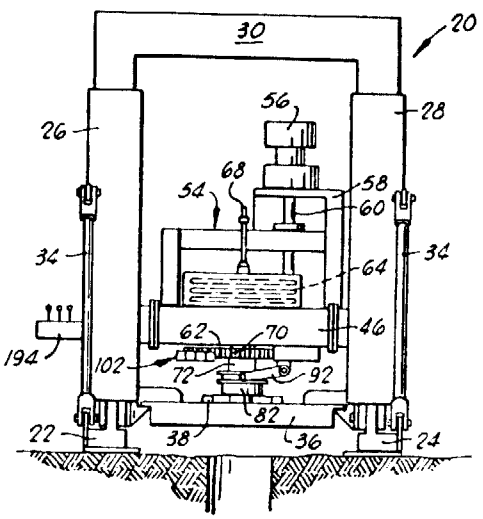
FIG. 2 is a front elevation view of the drilling machine of FIG. 1 with certain portions removed for clarity of illustration.
Figure 1:
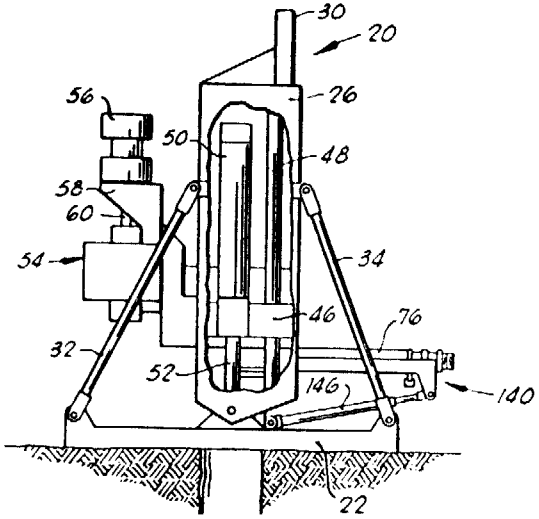
FIG. 1 is a side elevation partially broken out, of a top drive drilling machine incorporating apparatus constructed in accordance with the invention.

Referring to the drawing and to FIGS. 1 and 2 in particular, shown therein and generally designated by the reference character 20 is a top drive rotary drilling machine designed to be utilized in the drilling of raises and mines. The drilling machine 20 includes a pair of parallelly disposed spaced base members 22 and 24, side frame members 26 and 28 that are pivotally connected with the base members 22 and 24, respectively, and a top frame member 30 that extends between and connects the upper ends of the side frame members 26 and 28.

Although not shown, the side frame members 26 and 28 can be tilted with respect to the base members 22 and 24 through their pivotal connection. As illustrated, the side frame members 26 and 28 are held in the vertical position by links 32 and 34 which extend between the side frame members 26 and 28 and their respective base members 22 and 24. Manifestly, if the side frame members 26 and 28 are to be tilted, the links 32 and 34 will have to be either adjusted in length or replaced by links of a different length.

Figure 6:
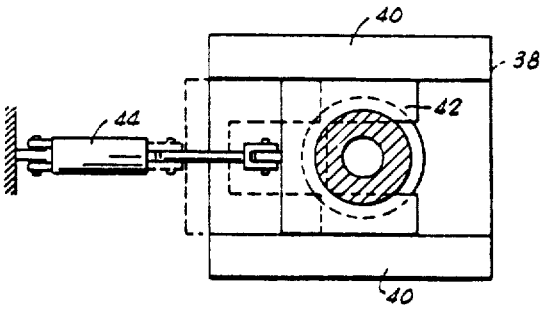
FIG. 6 is a view illustrating the operation of the slip mechanism taken generally along the lines 6—6 of FIG. 4.

A lower cross member 36 extends between the lower ends of the side members 26 and 28 as shown in FIG. 2. The lower cross member 36 supports a slip device 38. As shown in FIG. 6, the slip device 38 includes a pair of guide members 40 supported by the cross member 36 that are arranged to slidingly receive a generally U-shaped slip 42. The slip 42 is connected with a double-acting, hydraulic cylinder 44 so that the slip 42 can be reciprocated for reasons that will be pointed out more fully hereinafter.

A cross head 46 extends between the side frames 26 and 28 as shown in FIG. 2. The ends of the cross head 46 extend into the side frames 26 and 28 and are slidingly disposed on a guide rod 48 that is mounted in and extends vertically in the side frames 26 and 28. Each end of the cross head 46 is also connected with a double-acting, hydraulic cylinder 50. As shown in FIG. 1, each of the double-acting, hydraulic cylinders 50 includes a piston 52 that has its lower end connected with one of the side frames 26 and 28 so that a reciprocating motion is transmitted to the cross head 46 through the cylinders 50.

Mounted on the cross head 46 is a rotary drive mechanism generally designated by the reference character 54. The rotary drive mechanism 54 includes a hydraulic motor 56 that is mounted on a suitable frame 58 connecting the rotary drive mechanism 54 with the cross head 46.

The hydraulic motor 56 has an output shaft 60 that is connected through a suitable power transmission system to a rotary member 62. The power transmission system may include a chain drive mechanism 64 as shown in dish lines in FIG. 2.

Figures 3, 8:
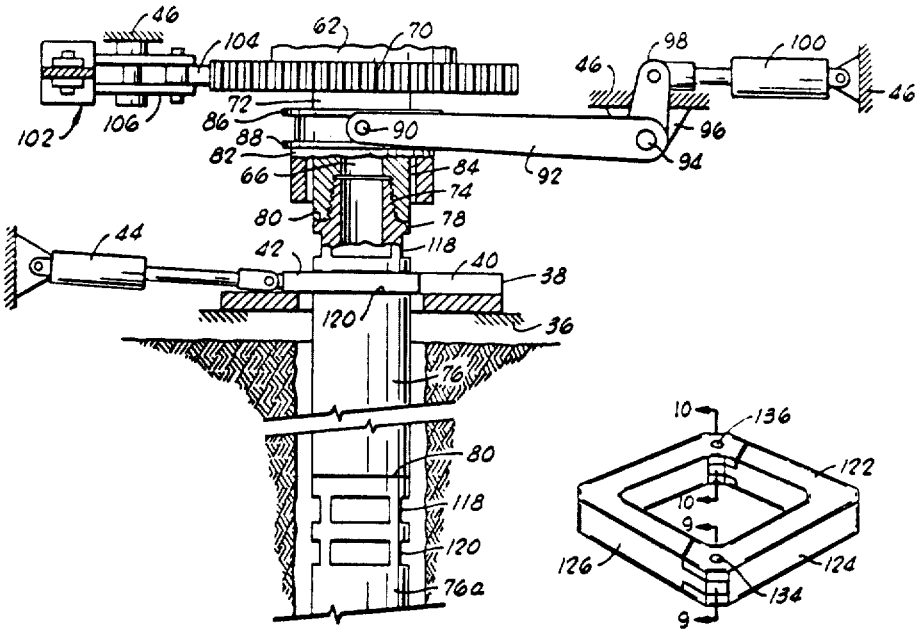
FIG. 3 is a schematic view, partly in elevation and partly in cross-section, of portions of the top drive drilling machine illustrating the use of the apparatus during removal of pipe sections from the well bore.
FIG. 8 is a pictorial view of one embodiment of a wrench utilized in the apparatus constructed in accordance with the invention.

As shown in FIG. 3, the rotary member 62 has a bore 66 extending therethrough. The bore 66 is in fluid communication with a conduit 68 having a swivel mounted thereon for connection with a source of drilling fluid (not shown) for reasons that are well known in the drilling art.

The rotary member 62 has a ratchet gear 70 mounted thereon for purposes that will become more apparent hereinafter and also includes a generally rectangular rotary drive member 72 having female threads 74 formed in the lower interior end thereof that are adapted to mate with the male thread formed on the upper end of a drill pipe section 76 as shown in FIG. 3. The rotary drive member 72 has a lower end surface 78 that engages an upwardly facing shoulder 80 on the drill pipe section 76 when the threads 74 are in full mating engagement.

Slidingly positioned on the rotary drive member 72 is a chuck 82 having a generally rectangular opening 84 extending therethrough (see also FIG. 7) so that the chuck 82 rotates with the rotary drive member 72. The chuck 82 is provided at its upper end with a pair of spaced flanges 86 and 88 that encircle the exterior thereof to receive a pair of bearings 90 (only one is shown in FIG. 3) that are carried by a pair of lever arms 92. The chuck 82 is rotatable relative to the arms 92.

The lever arms 92 are interconnected by a shaft 94 that extends in pivoting relationship through a bracket 96 mounted on the cross head 46. An actuating lever 98 connects the lever arms 92 with a double-acting, hydraulic cylinder 100 that is also mounted on the cross head 46. The arrangement of the linkage described provides a positive means through which actuation of the double-acting, hydraulic cylinder 100 can move the chuck 82 relatively along the axis of the pipe 76.

Also mounted on the cross head 46 is at torque applying mechanism generally designated by the reference character 102 that operates in conjunction with the ratchet gear 70. As shown most clearly in FIG. 7, the torque applying mechanism 102 includes a ratchet dog 104 that is engageable with the ratchet gear 70. The ratchet dog 104 is pivotally mounted on a lever arm 106 that is pivotally carried by a bracket 108 mounted on the cross head 46 (see FIG. 3). The opposite end of the lever arm 106 from the ratchet dog 104 is pivotally connected with a double-acting, cylinder 110 that is also mounted on the cross head 46. A spring 112 extends between the ratchet dog 104 and the lever arm 106 to bias the ratchet dog 104 toward a position in which it will engage the ratchet gear 70.

The torque applying mechanism 102 is intended to provide additional torque which may be necessary to unscrew the mating threads 74. Consequently, its direction of actuation will be in a direction opposite to the normal rotation of the device during drilling. Normal rotation of the pipe sections 102 tends to make the threads 74 tighter.

To positively maintain the ratchet dog 104 out of engagement with the ratchet gear 70 during drilling operations, a bracket 114 is mounted on the cross head 46 and adjustable cam 116 mounted therein. The cam 116 is positioned to engage the ratchet dog 104 when the cylinder 110 is in the retracted position. When the cam 116 is in engagement with the ratchet dog 104, the force of the spring 112 is overcome and prevents the ratchet dog 104 from being biased into engagement with the ratchet gear 70 by the spring 112.

Figure 4:
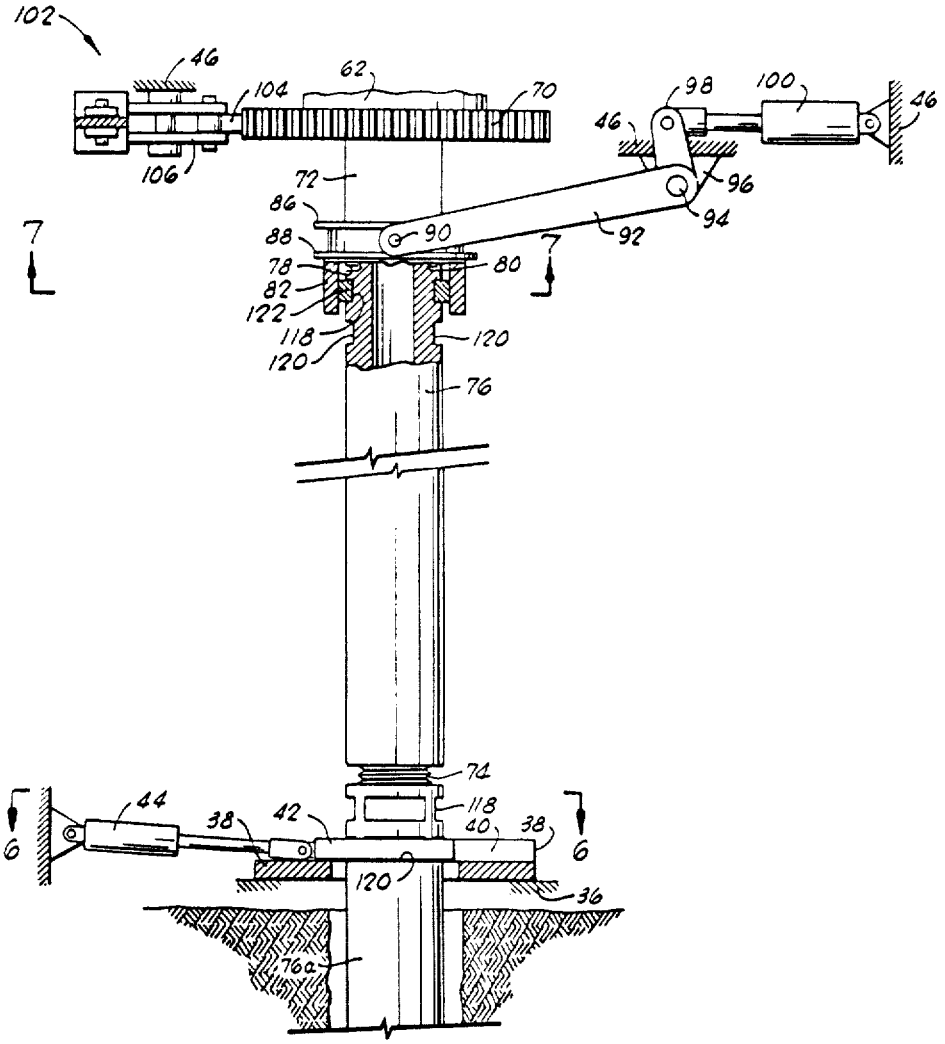
FIG. 4 is a view similar to FIG. 3, but showing the apparatus in another stage of operation.
Figure 5:
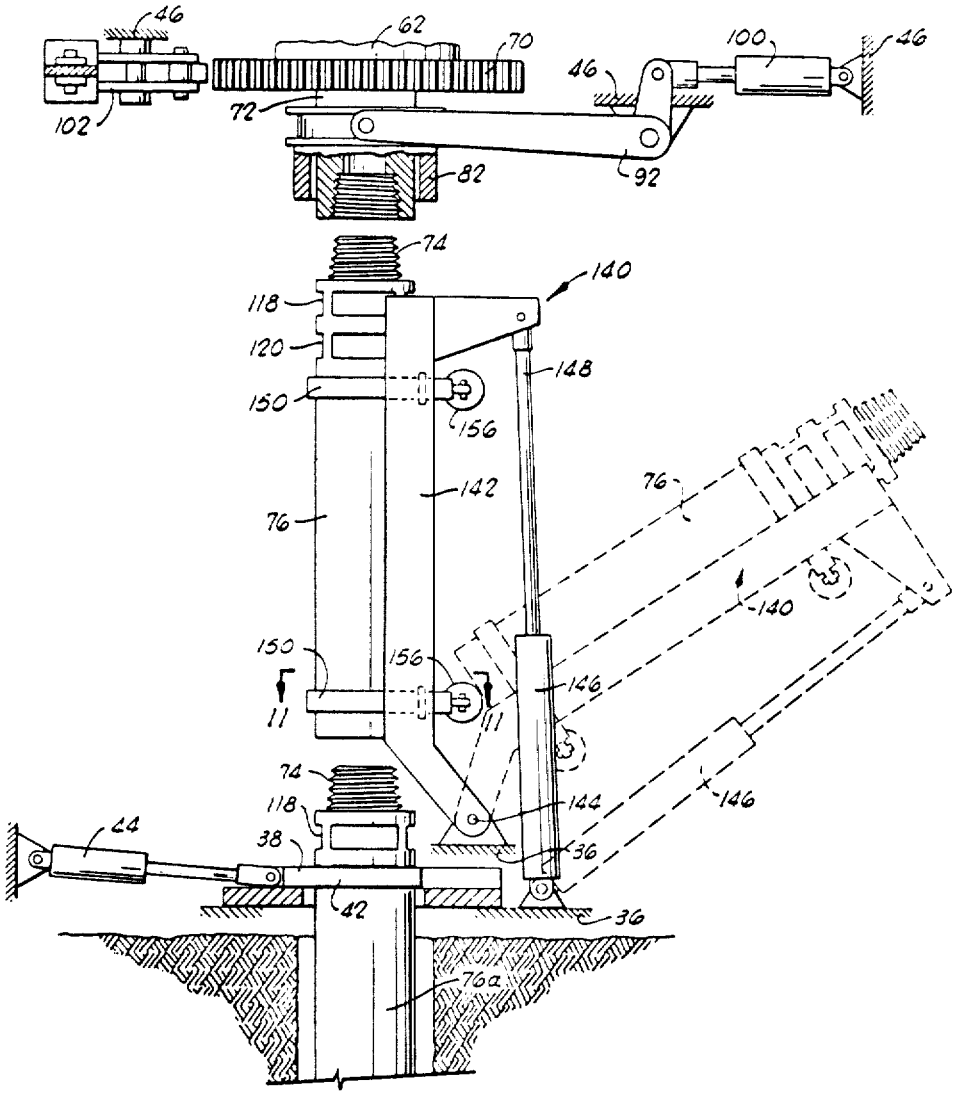
FIG 5 is another view similar to FIGS. 3 and 4, but showing the apparatus in still another operating position.

As may be seen in FIGS. 3, 4 and 5, the drill pipe string, which as previously mentioned, connects the rotary drive mechanism with the drill bit (not shown) is composed of a plurality of identical pipe sections 76, 76a, etc. Each of the pipe sections 76, 76a, etc. includes a pair of spaced flats 118 and 120 located near the upper ends thereof. Each of the flats 118 and 120 is formed on the drill pipe section to form a substantially rectangular surface thereon (see FIG. 7) to receive a wrench member 122 or to receive the U-shaped slip 42 depending upon the operation to be performed. It should also be pointed out that the drill pipe sections are interconnected by the mating threads 74. Between each section 76, 76a, etc., there is provided a downwardly facing surface corresponding to the surface 78 on the drive member 72 and an upwardly facing shoulder 80 which mate very tightly when the thread 74 is fully engaged. While each of the pipe sections is illustrated as having two sets of flats, only one is required to perform the unscrewing of the threaded connections as will be described hereinafter.

Figure 9:
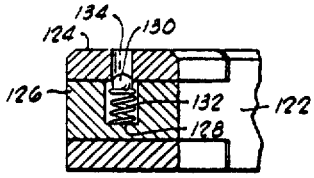
FIG. 9 is an enlarged cross-sectional view taken along the line 9—9 of FIG. 8.
Figure 10:
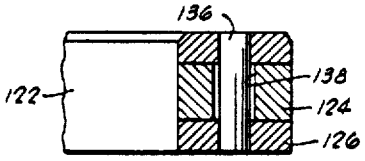
FIG. 10 is an enlarged cross-sectional view taken along the line 10—10 of FIG. 8.

The wrench 122 is illustrated more clearly in FIGS. 8, 9 and 10. As shown therein, the wrench 122 is constructed from two L-shaped members 124 and 126 having each pair of ends mating in a tongue and groove arrangement.

As illustrated in FIG. 9, a releasable latch is provided whereby the wrench 122 may be opened when desired. To form the releasable latch, a recess 128 is formed in the mating portion of the L-shaped section 126 and a ball 130 and spring 132 are disposed therein. The spring 132 is arranged to urge the ball 130 relatively toward a hole 134 that is drilled in the mating portion of the L-shaped section 124. The hole 134 serves as a detent, partially receiving the ball 130 whereby the members are releasably connected.

The opposite mating ends of the members 124 and 126 are formed into a similar tongue and groove arrangement. However, these mating end portions are preferably hinged together by a pin 136 that extends therethrough substantially as shown in FIG. 10. Preferably, the hole 138 extending through the tongue portion of the L-shaped member 124 is enlarged so that the hinging arrangement between the members 124 and 126 is relatively loose, permitting slight movement between the members 124 and 126 other than pivotal movement about the hinge pin 136. The movement is desirable so that the wrench 122 can be easily positioned in the opening 84 and on the flats 118 and 120, so that the chuck 82 will slide relatively easily thereover and so that the wrench 122 can move to accommodate the forces applied thereto during unscrewing of the threads 74. If desired, the pin 136 can be constructed from a resilient material that will permit the desired relative movement without the necessity of having the enlarged hole 138.

Referring to FIG. 5, shown therein is a pipe handling device designated generally by the reference character 140. The pipe handling device 140 includes a frame 142 that is connected with the cross member 36 by a pivot 144 and a double-acting, hydraulic cylinder 146 that is also pivotally connected with the cross member 36. The cylinder 146 includes a piston 148 that is pivotally connected with the frame 142 so that relative telescoping movement between the piston 148 and the cylinder 146 pivots the frame 142 about the pivot 144. A pair of spaced sets of pipe gripping members 150 are carried by the frame 142.

Figure 11:
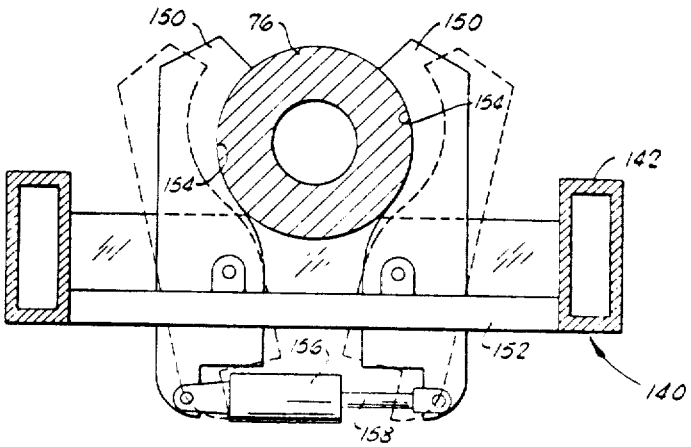
FIG. 11 is an enlarged cross-sectional view taken along the line 11—11 of FIG. 5 and illustrating the operation of a portion of the pipe handling mechanism.

As shown more clearly in FIG. 11, the pipe gripping members 150 are pivotally mounted on cross members 152 located in the frame 142. The innermost sides of the pipe gripping members 150 have radii 154 that are sized and arranged to encircle a portion of the pipe section 76 when the members 150 are in engagement therewith. A double-acting, hydraulic cylinder 156 is pivotally connected with one of the pipe gripping members 150 of each set and a piston 158 contained in the cylinder 156 is pivotally connected with the opposite gripping member 150 of each set whereby telescoping action between the piston 158 and cylinder 156 pivots the gripping members 150 are pivotally mounted on cross members the pipe section 76.

It will be appreciated that the various hydraulic components previously described can be replaced by equivalent pneumatic or electrical apparatus. However, to more clearly describe the preferred hydraulic embodiment, reference is now made to FIG. 12 wherein the hydraulic circuit is shown schematically. Manifestly, the circuit includes many well known components that have been omitted for clarity of illustration.

As shown therein, the hydraulic motor 56 is connected by conduits 160 and 162 with a reversible hydraulic pump 164. The hydraulic pump 164 is of the variable volume type wherein the output volume of the pump is varied to vary the speed of the motor 56. It will be noted that the circuit between the pump 164 and motor 56 is a closed circuit. However, a makeup line or conduit 166 connects the pump with the outlet from a reservoir 168 and a relief line or conduit 170 connects the pump 164 with the discharge into the reservoir 168.

A second pump 172 is connected with the reservoir 168 through the conduit 166 and with a control valve 174 that is located on the output side of the pump 172. The pump 172 may be generally described as a high volume, low pressure pump. A relief valve 176 is disposed between the control valve 174 and the pump 172 to protect the circuit and pump in the event that the pressure should reach a predetermined value that could damage the pump 172. The relief valve 176 is connected by a conduit 178 with the discharge into the reservoir 168.

The control valve 174 is a four-way valve having a conduit 180 extending therefrom that is connected with one end of each of the double-acting, hydraulic cylinders 50 and a conduit 182 extending therefrom that is connected with the opposite end of each of the double-acting, hydraulic cylinders 50. A discharge conduit 184 extends from the control valve 174 to return fluid to the reservoir 168. The arrangement is such that hydraulic fluid can be pumped through the conduit 180 to lower the cross head 46 (shown in dash lines in FIG. 12) and pumped through the conduit 182 to raise the cross head 46. The use of the high volume, low pressure pump with the cylinders 50 provides for very rapid movement of the cross head 46 without a great deal of power and is intended to be used primarily during movement of the pipe sections 76 into and out of the hole being drilled by the machine 20.

A third pump 186 is connected with the outlet from the reservoir 168 by a conduit 188. The pump 186 is of the low volume, high pressure type. A control valve 190 is connected with the outlet of the pump 186 and the control valve 190 is connected by a conduit 192 with a stack of control valves 194. A conduit 196 connects the conduit 192 with the reservoir 168 for the return of fluid to the reservoir 168. A pressure relief valve 198 is interposed in the conduit 196 and is set to relieve the pressure in the conduit 192 should it exceed a predetermined value.

One of the primary functions of the pump 186 is to provide relatively high pressure fluid to the double-acting, hydraulic cylinders 50 for drilling. To perform this function, the control valve 190 is connected by a conduit 200 with the conduit 182 which leads to one side of the cylinders 50. Similarly, the conduit 180, which leads to the opposite side of the cylinders 50, is connected with the control valve 190 by a conduit 202. The control valves 174 and 190 are arranged so that the hydraulic cylinders 50 can either be actuated by the high volume, low pressure pump 172 for rapid movement during tripping of the pipe 76 into and out of the bore or by the low volume, high pressure pump 186 for relatively slow but controlled high pressure movement of the cylinders 50 during drilling.

The opposite end of the stacked control valve 194 is provided with a conduit 204 for the return of fluid to the reservoir 168. Contained within the control valves 194 is a pressure relief valve (not shown) that is set to open at a predetermined pressure to prevent the imposition of unduly high pressure on the hydraulic cylinders with which the control valves 194 are connected.

Figure 12:
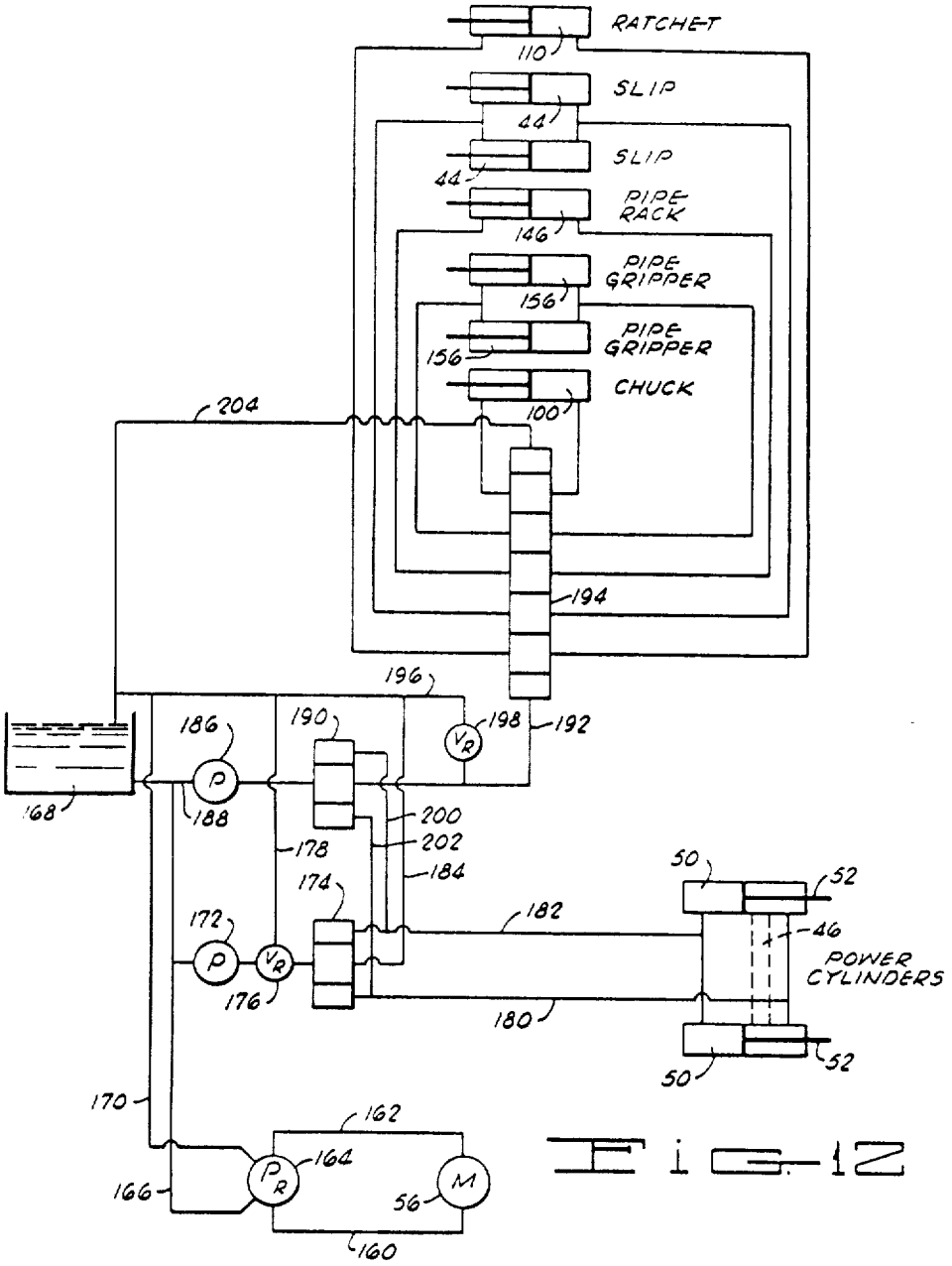
FIG. 12 is a schematic drawing of the hydraulic circuit utilized in the drilling machine of FIG. 1.

As clearly shown in FIG. 12, each of the individual valves contained within the stack of control valves 194 is connected with a respective double-acting cylinder 44, 100, 110, 146 or 156. The arrangement is such that the double-acting cylinders can be actuated to drive the pistons contained therein in the appropriate direction to affect the desired operation of the devices actuated by the cylinders.

Operation

As the bit (not shown) penetrates the formation in the bore, it is necessary to continually add pipe sections 76 to interconnect the drilling machine 20 with the bit. To accomplish this, a pipe section 76 is placed on the pipe handling device 140 as illustrated in FIG. 1. The pipe handling device 140 is then raised to the vertical position, as illustrated in FIG. 5, with the pipe section 76 securely retained therein by the gripping members 150. The cross head 46 is lowered by actuating the hydraulic cylinders 50 in the proper direction until the rotary drive member 72 engages the thread 74 on the pipe section 76. When this occurs, the gripping members 150 are released, and the cross head 46 is lowered until the threads 74 on the lower end of the pipe section 76 engage the mating threads on the upper end of the subjacent section 76a. The rotary drive 62 is actuated through the motor 56 tightening the mating threads 74.

The slip 42, holding the subjacent section 76a and all sectins of pipe 76 thereinbelow, is then released and the cross head 46 lowered until the bit (not shown) engages the bottom of the bore. As the rotary drive 62 rotates, the upwardly facing shoulder 80 on the pipe section 76 securely engages the downwardly facing surface 78 on the drive member 72 securing the drive member 72 and the various pipe sections 76, 76a, etc., together. During drilling, force is applied to the pipe string and bit through the hydraulic cylinders 50 which are actuated by the high pressure, low volume pump 186.

During the upward reaming of the hole when drilling raises or during a trip out of the hole when drilling downwardly, it is necessary to remove pipe sections from the string whereby the pipe string is shortened. To accomplish this, the slip 42, through the hydraulic cylinder 44, is moved into engagement with the flats 120 on the pipe section 76. The rotary drive member 72 is then rotated in a direction to unscrew the threads 74 until the initial engagement between the shoulder 80 and surface 78 is broken.

Due to the high torque loadings applied to the threads 74 during drilling, the initial torque necessary to separate the shoulder 80 and surface 78 may be extremely high. If the torque required is greater than that available through the motor 56, the torque applying mechanism 102 can be utilized to provide the additional torque required.

Figure 7:
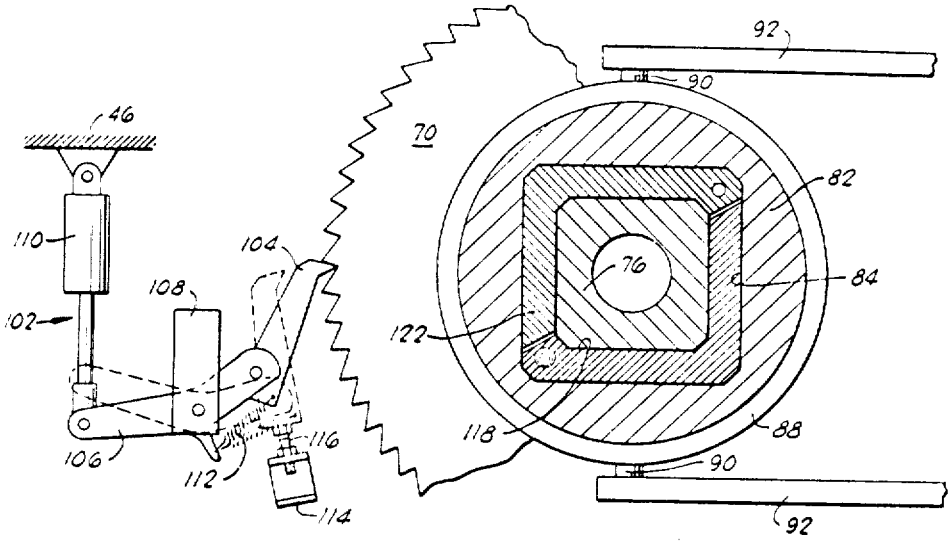
FIG. 7 is an enlarged view taken along the line 7—7 of FIG. 4 illustrating the operation of a torque applying mechanism that is also constructed in accordance with the invention.

As shown most clearly in FIG. 7, the torque applying mechanism 102 is actuated by applying hydraulic pressure through the appropriate one of the stacked control valves 194 to the hydraulic cylinder 110. Extension of the piston from the hydraulic cylinder 110 rotates the lever 106 in the bracket 108, moving the ratchet dog 104 into engagement with the teeth on the ratchet gear 70. Simultaneously, torque is applied by the hydraulic motor 56 tending to rotate the drive member 72 in the same direction as the force applied by the ratchet dog 104. Thus, the torque applying mechanism 102 exerts an additional torque that will be sufficient to disengage the shoulder 80 and surface 78 whereby the threads 74 can be parted.

If it is necessary to rotate the drive member 72 more than is available through the initial engagement between the ratchet dog 104 and the ratchet gear 70, pressure can be applied to the opposite side of the hydraulic cylinder 110, disengaging the ratchet dog 104 from the teeth on the gear 70. The pressure is then reapplied to the cylinder 110, moving the ratchet dog 104 into engagement with the next tooth on the gear 70 to rotate the gear and the attached rotary drive 72 a greater distance until the initial engagement between the shoulder 80 and surface 78 is broken.

After the shoulder 80 and surface 78 have parted slightly, the wrench member 122 is latched about the upper flats 118 in the pipe section 76. With the wrench 122 in position on the flats 118, the hydraulic cylinder 100 is actuated to move the chuck 82 downwardly over the wrench 122 as illustrated in FIG. 4.

The slip 42 is removed from the flats 120 on the pipe section 76 and the hydraulic cylinders 50 are actuated to raise the cross head 46 and pipe sections until the subjacent pipe section 76a is positioned with the lower flats 120 thereon in alignment with the slip 42. The slip 42 is actuated through the hydraulic cylinder 44, moving the slip 42 into engagement with the subjacent section 76a.

With the torque applying mechanism 102 disengaged and the wrench 122 engaged, the hydraulic motor 56 is actuated to rotate the drive member 72 and attached pipe section 76 relative to the subjacent pipe section 76a, parting the threads 74 therebetween. If necessary, the torque applying mechanism 102 can be actuated to provide additional torque to break the engagement between the pipe section 76 and 76a as previously described. As the thread between the section 76 and the subjacent section 76a part, the cross head 46 is raised until the section 76 is completely free of the subjacent section 76a, that is, pipe section 76 is raised to the position illustrated in FIG. 5.

It should be pointed out that the wrench 122 can be constructed relatively light so that it can be easily handled. This is possible because the torque is transmitted through the rectangular drive member 72 to the chuck 82, wrench 122 and to the flats 118. The wrench 122 serves only as a filler between the chuck 82 and the flats 118 on the pipe section 76 and the load placed thereon is essentially a compressive load.

When the pipe section 76 has been completely separated from the subjacent section 76a, the chuck 82 is raised and the wrench 122 removed from the flats 118. The pipe handling mechanism 140 is then raised to the position illustrated in FIG. 5 and the pipe gripping members 150 actuated through the hydraulic cylinder 156 to securely engage the pipe section 76.

With the gripping members 150 securely holding the pipe section 76, the hydraulic motor 56 is actuated to rotate the drive member 72, unthreading the threads 74 between the drive member 72 and the pipe section 76. At this point, it can be appreciated that the pipe section 76 is completely free of any connection with the drive member 72 or with the subjacent pipe section 76a. The hydraulic cylinder 146 is then actuated to lower the pipe handling device 140 and the pipe section 76 into a horizontal position whereupon the pipe gripping members are released and the pipe section 76 removed.

The foregoing procedure is repeated until the desired number of pipe sections have been removed. From the foregoing, it can be appreciated that the apparatus described provides a means for breaking the various threaded connections between the pipe sections at selected connections therebetween.

Without the wrench 122 and the chuck 82, the application of torque to the drive member 72 would result in the separation of a threaded connection, but it is not immediately discernible which threaded connection might part. If the threads 74 between the drive member 72 and the pipe section 76 were to separate, it would be extremely difficult to engage the pipe section 76 to provide sufficient torque to break out the thread between the pipe section 76 and pipe section 76a. Also, if the lower thread, that is, the thread between the pipe section 76 and the subjacent pipe section 76a were to part, it would require a massive pipe handling mechanism to grip the pipe section 76 with sufficient force to resist rotation when it is attempted to break the thread 74 beween the drive member 72 and the pipe section 76. However, when utilizing the apparatus constructed in accordance with this invention, the threaded connections can be broken when and where desired.

Figure 13:
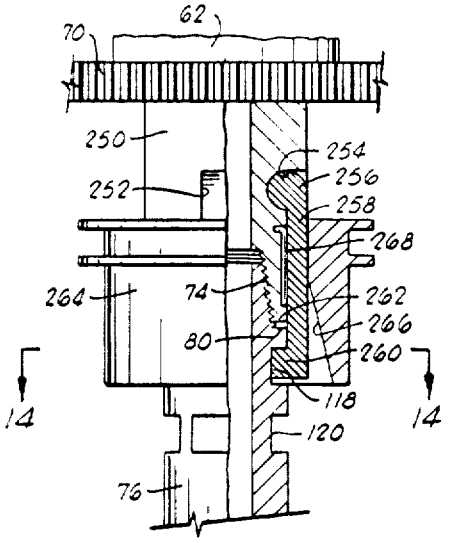
FIG. 13 is a fragmentary view, partially in elevation and partially in cross-section illustrating another embodiment of apparatus that is also constructed in accordance with the invention.

Embodiment of FIGURE 13

Figure 15:
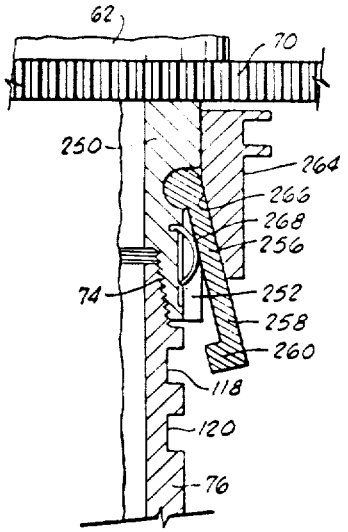
FIG. 15 is a cross-sectional view similar to the right hand portion of FIG. 13, illustrating the apparatus of FIG. 13 in another operating position.
Figure 14:
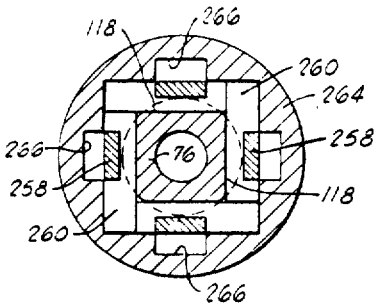
FIG. 14 is a cross-sectional view taken along the line 14—14 of FIG. 13.

FIGS. 13, 14 and 15 illustrate another embodiment of wrenching arrangement that can be utilized in the top drive drilling machine 20. As shown in FIG. 13, a generally rectangular drive member 250 is connected with the ratchet gear 70 and rotating member 62 as was the rotary drive member 72 of the embodiment of FIG. 1.

Circumferentially spaced, longitudinally extending slots 252 are formed in the exterior of the drive member 250 with the upper ends 254 of the slots 252 radiused inwardly as clearly shown. Each of the slots 252 is arranged to pivotally receive a wrench dog 256.

Each of the wrench dogs 256 includes an arm portion 258 that extends downwardly through the slots 252. The lower end of each dog 256 is formed into a wrench lug 260. The lugs 260 are sized and arranged to be disposed in the flats 118 or 120 of the pipe section 76.

The drive member 250 is provided interiorly with the mating threads arranged to mate with the threads 74 on the upper end of the drill pipe section 76. Also, the drive member 250 has a downwardly facing surface 262 on the lower end thereof arranged to engage the shoulder 80 on the drill pipe section 76.

To hold the wrench dogs 256 in engagement with the pipe section 76, a chuck 264 having a rectangular opening therein is slideably spaced on the drive member 250. By comparing the chuck 264 with the chuck 82, it can be appreciated that the only distinction therebetween lies in the provision of angularly extending slots 266 in the interior of the chuck 264 adjacent the wrench dogs 256. The slots 266 are provided to reduce the vertical movement necessary in the chuck member 264 to permit the wrench dogs 256 to move to the fully disengaged position as illustrated in FIG. 15.

A spring 268 carried by the drive member 250 is located between each of the wrench dogs 256 and the drive member 250 in the slots 252. As can be seen in FIG. 15, the springs 268 are arranged to return to an arcuate configuration biasing the wrench dogs 256 outwardly into the slots 266 when the chuck 264 has been raised.

As illustrated in FIG. 13, the initial engagement between the shoulder 80 on the pipe section 76 and the surface 262 on the drive member 250 has been previously broken as described in connection with the previous embodiment. The chuck 264 is disposed in the lower position holding the wrench dogs 256 in the flats 118. As can be clearly seen in FIG. 14, the lugs 260 on the wrench dogs 256 are configured so that they entirely fill the rectangular space between the flats 118 and the interior of the chuck 264. With this arrangement, the torque transmitted through the drive member 250 to the pipe section 76 to break the threads between the pipe section 76 and the subjacent pipe section 76 is transmitted from the chuck 264 to the pipe section 76 through the wrench dogs 256. As previously decribed, the load on the lugs 260 is essentially a compressive load since the lugs are completely contained within the chuck 264.

When it is desired to release the wrench dogs 256 from engagement with the pipe section 76, the chuck 264 is raised to the position shown in FIG. 15. The springs 268 return to their arcuate configuration, biasing the wrench dogs 256 outwardly and away from the flats 118 on the pipe section 76. With the wrench dogs 256 in the position shown, power can be transmitted through the rotary member 50 to unscrew the mating threads 74 between the rotary drive member 250 and the pipe section 76.

As can be appreciated from the foregoing and from viewing FIGS. 13, 14 and 15, the wrenching arrangement shown therein is fully automatic in that it does not require the manual application of the wrench 122 as was true with the previously described embodiment. Also, the lifting force applied to the pipe string when raising the pipe section 76 to a position wherein the mating threads between the pipe sections 76 and the subjacent pipe section 76 can be disconnected is provided by the wrench dogs 256 through the engagement of the lugs 260 with the pipe sections 76. Depending on the length of the arm portions 258, the lifting force may also be provided by the partially disconnected mating threads 74 between the rotary drive member 250 and the pipe sections 76. Thus, there is provided an additional safety factor during the lifting of the pipe string from the bore.

Figure 16:
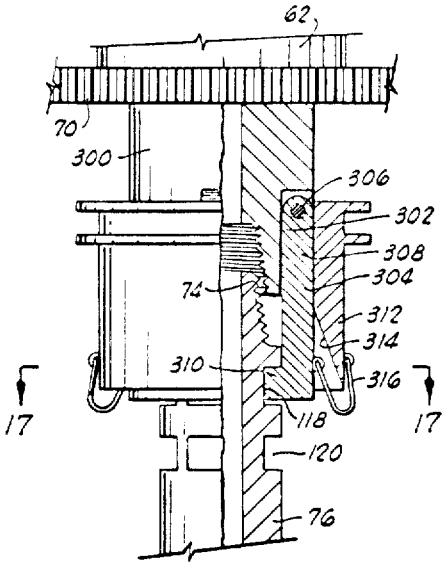
FIG. 16 is a fragmentary view, partly in elevation and partly in cross-section, illustrating still another embodiment of apparatus constructed in accordance with the invention.

Embodiment of FIG. 16

Figure 18:
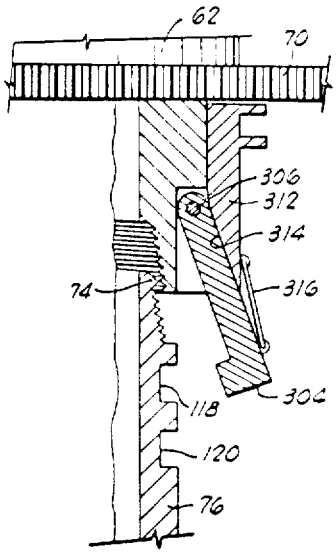
FIG. 18 is a cross-sectional view similar to the right hand portion of FIG. 16 and illustrating the apparatus of FIG. 16 in another operating position.
Figure 17:
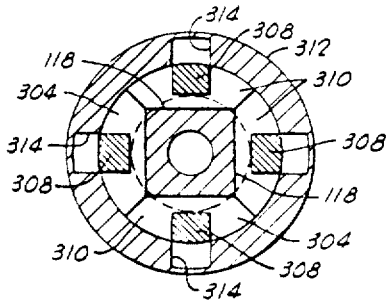
FIG. 17 is a cross-sectional view taken along the line 17—17 of FIG. 16.

FIGS. 16, 17 and 18 illustrate another embodiment of wrenching means that can be utilized to apply torque to the pipe sections in the drilling machine 20. As shown therein, a cylindrical rotary drive member 300 is connected with the drive mechanism 62 and with the ratchet gear 70.

The drive member 300 has female threads formed therein adapted to engage the threads on the drill pipe section 76 and has a plurality of circumferentially spaced slots 302 formed in and extending through the lower end thereof. The slots 302 are sized and arranged to receive a plurality of wrench dogs 304 that are each pivotally connected with the drive member 300 by a pivot pin 306. The wrench dogs 304 include an arm portion 308 terminating at its lower end in a lug portion 310. As shown more clearly in FIG. 17, the lug portions 310 have mitered ends so that they completely fill the space between the flats 118 on the pipe section 76 and the interior of a chuck 312.

The chuck 312 has a circular opening extending therethrough and is slideably disposed on the cylindrical rotary drive member 300. An angularly extending slot 314 is formed in the chuck 312 adjacent each of the arm portions 308 of the wrench dogs 304 to reduce the vertical movement of the chuck 312 that is neessary to permit the wrench dogs 304 to move to the disengaged position illustrated in FIG. 18.

As shown in FIG. 16, the wrench dogs 304 are securely held in the position engaging the flats 118 of pipe section 76 when the chuck 312 is in the lower position on the drive member. To be certain that the wrench dogs 304 will completely disengage the pipe section 76 as the chuck 312 is moved upwardly, a flexible member 316, such as a wire cable or strong cord, is attached to the lower end of each arm portion 308 and to the exterior of the chuck 312. As may be clearly seen in FIG. 16, the flexible member 316 does not interfere with the movement of the wrench dogs 304 into the flats 118 when the chuck 312 is in the lower position. The member 316 is placed in tension, as shown in FIG. 18, when the chuck 312 is raised so that the wrench dogs 304 are positively moved outwardly into the slots 314 formed in the chuck 312 and out of engagement with the pipe section 76.

In the wrenching arrangement illustrated in FIG. 16, as well as the arrangement illustrated in FIG. 13, the lifting force applied to the pipe sections 76 can be carried by the engagement of the wrench dogs 304 which engage the pipe section 76. Since it is not necessary to have engagement between the mating threads 74 to provide the lifting force, the mating threads 74 between the rotary member and pipe section can be completely loosened. With the threads completely disengaged, the wrench dogs 304 can be more easily aligned with and inserted into the flats 118.

It will also be noted in the embodiment of FIG. 16 that the circular exterior of the drive member 300 and the circular interior of the chuck 312 will not permit torque to be transmitted therethrough. Torque, in the wrenching arrangement of FIG. 16, is transmitted from the rotary drive member 300 directly through the wrench dogs 304 to the flats 118 of the pipe section 76. The chuck 312 serves to prevent deflection of the wrench dogs 304 outwardly out of engagement with the pipe section 76.

The wrenching arrangement of FIG. 16 has the advantages of being fully automatic, that is, nothing, such as the application of the wrench 122 must be applied manually; the mating treads 74 can be completely unscrewed since the lifting force is applied through the wrench dogs 304, thereby permitting the wrench dogs 304 to be more easily aligned with the flats 118; and, the positive engagement of the wrench dogs 304 with the pipe sections 76 and the flats 118 avoids the exertion of tensile forces on the threads, whereby the wrenching arrangement has a longer and more maintenance-free life.

It will be understood that the embodiments described in detail hereinbefore are presented by way of example only and that many changes and modifications can be made thereto without departing from the spirit of the invention or from the scope of the annexed claims.

The embodiments of the invention in which an exclusive property or privilege is claimed are defined as follows:

1. Apparatus for unscrewing selected threaded connections between sections of pipe and the like wherein each pipe section has flats on the exterior thereof, said apparatus comprising:

rotating means engageable with one of the pipe sections for rotating the pipe, said rotating means including a chuck member slidingly mounted thereon, said chuck member having an opening extending coaxially therethrough with respect to the axis of said pipe;

moving means for displacing said rotating means and pipe along the axis of said pipe;

wrench means adapted to be positioned in the flats and sized to be received within said opening in engagement with said chuck member;

chuck actuating means for moving said chuck member into engagement with said wrench means holding said wrench means in said flats connecting said one pipe section and rotating means for common rotation; and slip means movable into holding engagement with the flats on said one pipe section, whereby the rotating means is rotated to break the connection between said one pipe section and the rotating means, and said slip means being movable into holding engagement with the flats on the subjacent pipe section upon movement of said pipe sections by said moving means, whereby rotation of the rotating means rotates said one pipe section engaged by the wrench means and unthreads the connection between the pipe sections;

*wherein said wrench means includes a plurality of wrench dogs pivotally mounted on and rotatable with said rotating means and receivable in the opening in said chuck member, said dogs having a lug portion engageable with the flats on the pipe section in response to movement of said chuck member relatively toward the pipe section.*

[2. The apparatus of claim 1 wherein said wrench means includes:

a pair of generally L-shaped members having first and second mating end portions, said wrench means being of generally rectangular configuration when said L-shaped members are placed in mating relationship;

connecting means joining said first and second mating end portions, at least one of said connecting means being releasable whereby said wrench means can be opened for positioning on the flats and closed when placed thereon.]

[3. The apparatus of claim 2 wherein one of said connecting means includes a hinge pin pivotally connecting one of said first and second mating end portions.]

[4. The apparatus of claim 2 wherein the releasable connecting means joins said second mating end portion and includes:

a plunger reciprocally positioned in one end portion of said second mating end portion;

resilient means biasing said plunger relatively toward the other end portion of said second mating end portion; and, said other end portion having a recess therein for receiving said plunger to releasably connect said second mating end portion together.]

[5. The apparatus of claim 1 wherein said wrench means includes a plurality of wrench dogs pivotally mounted on and rotatable with said rotating means and receivable in the opening in said chuck member, said dogs having a lug portion engageable with the flats on the pipe section in response to movement of said chuck member relatively toward the pipe section.]

6. The apparatus of claim [5] *1* and also including biasing means engaging said wrench dogs to move said dogs out of engagement with the flats when said chuck member is moved relatively away from the pipe section.

7. The apparatus of claim [5] *1* wherein said chuck member includes a substantially flat surface in said opening adjacent each said wrench dog and each said wrench dog includes a mating substantially flat surface, said surfaces being in mating engagement when said chuck member is moved relatively toward the pipe section to lock said rotating means, pipe section and chuck member together for common rotation.

8. The apparatus of claim [5] *1* wherein:

the opening in said chuck member is substantially circular in cross-section;

said rotating means has a slot for each said wrench dog extending substantially parallel to the axis of the pipe; and each said wrench dog includes an arm portion extending from said lug portion, each said arm portion being pivotally connected with said rotating means and located in a respective one of said slots, whereby said rotating means and pipe section are connected for common rotation, and each lug portion has a surface engageable with the chuck member, whereby said dogs are held in engagement with the flats on the pipe section when the chuck member is moved relatively toward the pipe section.

[9. The apparatus of claim 1 and also including torque applying means engageable with said rotating means to apply additional torque therethrough to aid in disconnecting said threaded connections.]

[10. The apparatus of claim 9 wherein said torque applying means includes:

a ratchet gear mounted for rotation with said rotating means;

a ratchet dog pivotally mounted on said moving means and engageable with said ratchet gear;

resilient means biasing said ratchet dog toward a position wherein said ratchet dog engages said ratchet gear; and, force applying means on said moving means operably connected with said ratchet dog for moving said ratchet dog into engagement with said ratchet gear to apply torque to said rotating means in a direction to unscrew the threaded connections.]

[11. The apparatus of claim 10 and also including a cam member mounted on said moving means, said cam member being engageable with said ratchet dog to move said ratchet dog out of engagement with said ratchet gear.]

[12. The apparatus of claim 11 wherein said force applying means comprises a double-acting hydraulic cylinder and piston assembly.]

[13. The apparatus of claim 1 and also including pipe handling means for engaging said one pipe section after the connection between said one pipe section and said subjacent pipe section has been unthreaded permitting relative rotation between rotating means and said one pipe section disengaging the engagement therebetween.]

[14. The apparatus of claim 13 wherein said pipe handling means includes:

a frame movable between a position adjacent and parallel to the axis of said pipe sections and a position relatively remote therefrom;

means for moving said frame; and, pipe gripping means carried by said frame, said gripping means being engageable with said one pipe to hold said one pipe section against rotation.]

[15. The apparatus of claim 14 wherein said pipe gripping means includes:

a first set of gripping members pivotally mounted on said frame;

a second set of gripping members pivotally mounted on said frame in spaced relation to said first set of gripping members; and, actuating means for each set of gripping members arranged to move said gripping members into and out of engagement with said one pipe section.]

[16. In rotary drilling apparatus including moving means for raising and lowering elongated, threadedly connected pipe sections into and out of a well bore and the like, each of the sections having flats on the exterior thereof and rotating means engageable with the pipe sections for rotating the pipe sections, the improvement comprising:

a chuck member carried by the rotating means, said chuck member being rotatable therewith and slidable thereon along the axis of the pipe sections, said chuck member having a generally rectangular opening extending coaxially therethrough relative to the axis of the pipe sections;

a wrench member adapted to be removably located in said flats and sized to be received within said rectangular opening for engagement with said chuck member;

chuck actuating means for moving said chuck member into engagement with said wrench member when said wrench member is located in said flats connecting the pipe section, wrench member and rotating means for common rotation; and, slip means movable into holding engagement with the flats on one pipe section, whereby the rotating means is rotated to break the connection between said one pipe section and the rotating means, and said slip means being movable into holding engagement with the flats on the subjacent pipe section when said pipe sections are raised, whereby rotation of the rotating means rotates the pipe section engaged by the wrench member and unthreads the connection between the pipe sections.]

[17. The apparatus of claim 16 and also including:

torque applying means including a ratchet gear mounted for rotation with said rotating means;

a ratchet dog pivotally mounted on said moving means and engageable with said ratchet gear;

resilient means biasing said ratchet dog toward a position wherein said ratchet dog engages said ratchet gear;

force applying means on said moving means operably connected with said ratchet dog for moving said ratchet dog into engagement with said ratchet gear to apply torque on said rotating means in a direction to unscrew the threaded connections; and a cam member mounted on said moving means, said cam member being engageable with said ratchet dog to move said ratchet dog out of engagement with said ratchet gear; and, pipe handling means including a frame movable between a position adjacent and parallel to the axis of said pipe sections and a position relatively remote therefrom, means for moving said frame, and pipe gripping means carried by said frame, said gripping means being engageable with said one pipe section to hold said one pipe section against rotation.]

[18. The apparatus of claim 17 wherein said wrench member comprises:

a pair of generally L-shaped members having first and second mating end portions, said wrench member, when said L-shaped members are placed in mating relationship, having a generally rectangular configuration;

hinge means pivotally connecting said first mating end portion; and, latch means releasably connecting said second mating end portion, whereby said wrench member can be opened for positioning on the flats and latched closed when placed therein, said latch means including a plunger reciprocally positioned in one said end portion of said second mating end portion, resilient means biasing said plunger relatively toward the other end portion of said second mating end portion, and said other end portion having a recess therein for receiving said plunger to releasably latch said second mating end portion together.]

References Cited

The following references, cited by the Examiner, are of record in the patented file of this patent or the original patent.

UNITED STATES PATENTS

| | | | |
|---|---|---|---|
| 2,781,185 | 2/1957 | Robbins | 175—85 X |
| 2,849,212 | 8/1958 | Robbins | 175—85 X |
| 3,212,578 | 10/1965 | Hasha | 166—49 |
| 3,239,016 | 3/1966 | Alexander | 166—49 X |
| 3,312,294 | 4/1967 | Wilson | 175—85 X |
| 3,336,991 | 8/1967 | Klem | 175—85 |

NILE C. BYERS, JR., Primary Examiner

U.S. Cl. X.R.

166—315; 175—85